Figure 1:
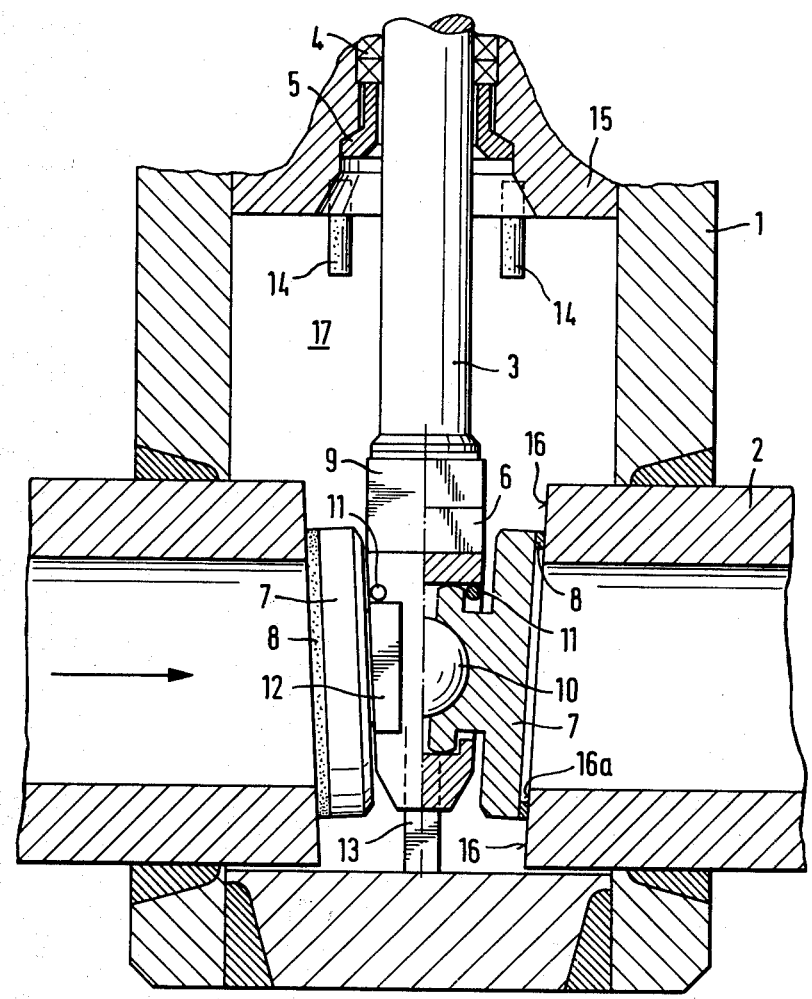

United States Patent [19]

Uomala

[11] 4,367,766
[45] Jan. 11, 1983

[54] SLIDE VALVE

[75] Inventor: Vilho Uomala, Pietarsaari, Finland

[73] Assignee: Oy Wartsila Ab, Helsinki, Finland

[21] Appl. No.: 140,243

[22] Filed: Apr. 14, 1980

[30] Foreign Application Priority Data

Apr. 18, 1979 [FI] Finland ............................ 791247

[51] Int. Cl.³ ........................................... F16K 29/00
[52] U.S. Cl. .............................. 137/243; 51/241 VS;
137/330; 251/327; 251/328
[58] Field of Search ............ 137/242, 243, 329, 329.05,
137/330; 251/327, 328, 86, 195, 203; 51/241
VS, 241 A

[56] References Cited

U.S. PATENT DOCUMENTS

| | | | |
|---|---|---|---|
| 342,542 | 5/1886 | Scott | 251/195 |
| 1,091,918 | 3/1914 | Eyon | 137/242 |
| 1,836,374 | 12/1931 | Kelly | 137/242 |
| 2,797,062 | 6/1957 | Otter | 251/328 |
| 2,948,503 | 8/1960 | Williams | 251/327 |
| 2,964,291 | 12/1960 | Williams et al. | 251/327 |
| 3,078,871 | 2/1963 | Magon | 251/329 |
| 3,215,399 | 11/1965 | McInerney et al. | 251/327 |
| 3,478,771 | 11/1969 | Johnson | 251/328 |
| 3,575,380 | 4/1971 | Siver | 251/327 |

Primary Examiner—George L. Walton
Attorney, Agent, or Firm—McAulay, Fields, Fisher, Goldstein & Nissen

[57] ABSTRACT

A slide valve with a slightly wedge-formed valve member arranged to close a flow duct by a cross-wise movement relative to the duct. There are annular sealing surfaces surrounding the flow duct and they are engageable by sealing side portions of the valve member for closing the valve. The sealing side portions of the valve member are considerably narrower than the annular sealing surfaces of the flow duct and are, in the closing position of the valve, located at a relatively great distance from the inner edge of the annular sealing surfaces. The sealing side portions of the valve member are of a softer material than the annular sealing surfaces, and hence, are subject to a repeated grinding against the annular sealing surfaces, when operating the valve. The sealing side portions of the valve member may be located each to a separate slide unit journalled in a body portion of the valve member. The slide units are in that case arranged to be slightly rotated by the opening movement of the valve.

11 Claims, 3 Drawing Figures

SLIDE VALVE

The invention relates to a slide valve.

It is evident from known slide valves that the wear of the sealing surfaces strongly concentrates to certain areas. These areas are located in those portions of the sealing surfaces which are the first ones to be exposed to the flow when opening the valve, and, on the other hand, are the last ones to be exposed to the flow when closing the valve. The wear is caused by the high flow speed occurring during opening and closing of the valve.

The object of the invention is to eliminate the flow dependent, usually strongly asymmmetrical wear effects referred to, so as to improve considerably the endurance of the sealing surfaces and the life of the entire valve.

The characterizing features of the invention are disclosed herein. In a construction according to the invention, those areas of the flow duct surrounding sealing surfaces, which are engaged by the sealing surfaces of the valve member when closing the valve, are located to a position at a suitable distance from the edge between the inner surface of the flow duct and the sealing surface of the duct, at which edge wear caused by the flow usually appears. Thus, by means of the invention, the actual sealing area of the flow duct sealing surfaces will be protected against wear. In addition, it is possible to manage with considerably smaller forces than in conventional valves for producing an adequate surface pressure between the sealing surfaces, which increases the life of the valve. Further, in a narrow sealing surface the wear does not cause deformations to such an extent as in a broader surface, which in turn improves the tightness of the valve.

In the sealing surfaces of the valve member, there will also occur wear in places corresponding to the ones of the flow duct sealing surfaces. Thus, it is favourable to make at least the sealing portions of the valve member of a softer material than the sealing surfaces of the flow duct. In this way, the sealing surfaces of the valve member will be ground against the flow duct sealing surfaces when opening and closing the valve, whereby the slightly wedge-formed valve member will advance correspondingly further relatively to the flow duct when closing the valve. Thus, irrespective of the wear, or actually just because of the wear, the valve is always kept tight.

In order to obtain that the wear and grinding of the valve member takes part as evenly as possible, the valve member comprises two separate slide units provided each with a sealing surface and being journalled in the body portion of the valve member, which units are arranged to rotate somewhat around their supporting shafts at every opening cycle of the valve. For this purpose the valve is provided with preferably flexible pins, which are so located, that they give said slide units a rotating movement due to the opening movement of the valve member.

In order to facilitate the grinding of the sealing surfaces, the valve member may be connected to a valve spindle in such a manner that it is movable in the direction of the flow duct. For restricting said movement, the valve member includes guide members, which cooperate with stationary guides in the valve housing. By using the opening and closing motion of the valve member and its movability transverse thereto a sufficient grinding of the sealing surfaces is obtained.

In case the flowing medium comprises impurities disposed to adhere to the sealing surfaces, the sealing portions of the valve member may be given the form of a protruding annulus, which may be provided with a scraping edge. Thus, the flow duct sealing surfaces can be cleaned before said grinding of the sealing surfaces against each other.

Figure 2:
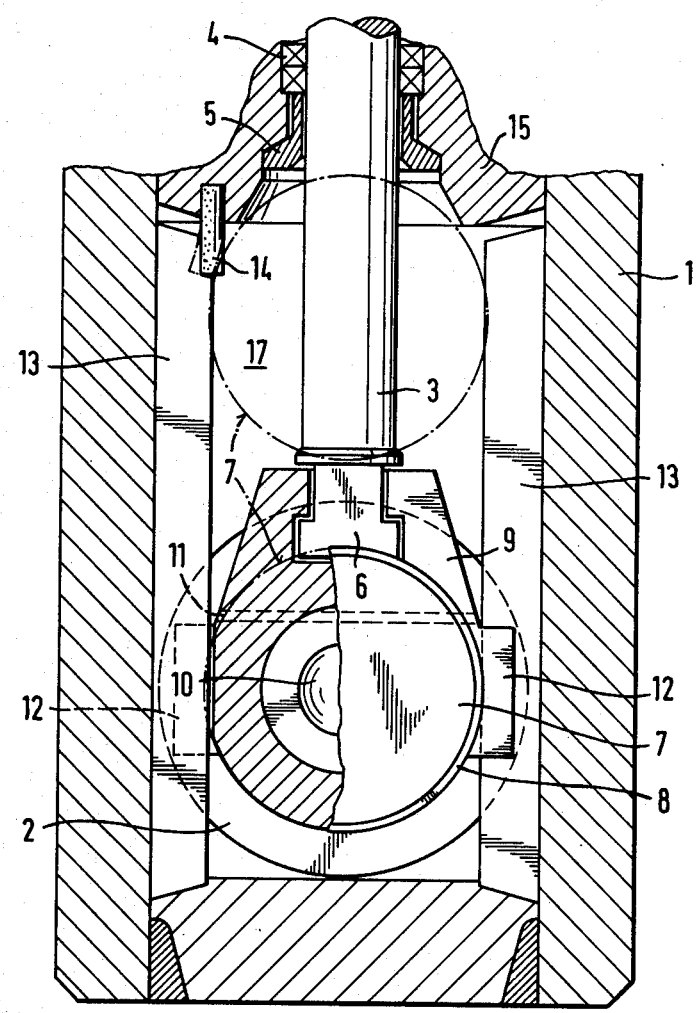
Figure 3:
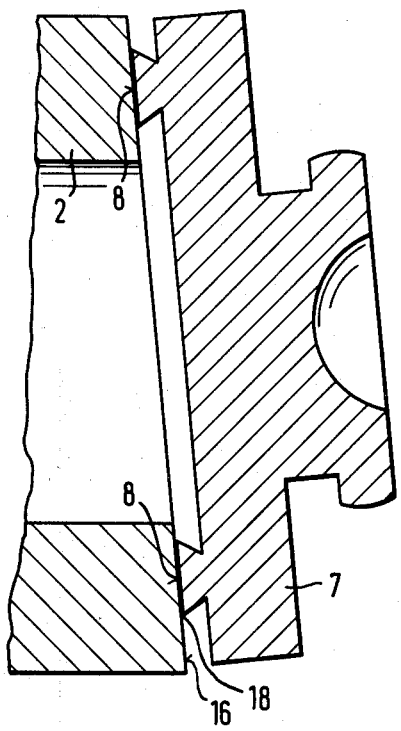

In the following, the invention is described more in detail with reference to the attached drawing, in which:

FIG. 1 shows an embodiment of a slide valve according to the invention in axial section, FIG. 2 shows a cross-section of the slide valve of FIG. 1, FIG. 3 shows an alternative embodiment of the sealing surfaces of the valve member.

In the drawing, numeral 1 indicates a valve housing, through which flow medium is led by means of flow pipes 2. One favourable design of the valve housing is disclosed in German patent specification No. 885507. A wedge-shaped valve member is connected to an axially movable valve spindle 3. For closing the valve, the valve member is moved between the flow pipes 2 by means of the movement of spindle 3.

A body portion 9 of the valve member is connected to valve spindle 3 by means of a T-joint 6 permitting movements in the direction of flow pipes 2. Two separate slide units 7 are journalled in body portion 9 by means of a ball 10, which units have an annular sealing surface 8, corresponding to a sealing surface 16 at the end face of flow pipe 2. The fitting of the slide units 7 is arranged by means of flange members. Also locking pins 11 extending through valve member body portion 9 are used.

The valve further comprises a cover 15, through which valve spindle 3 passes. For sealing spindle 3 the valve comprises a seal 4 as well as a spindle guiding and sealing sleeve 5. The drawing does not show the valve cover nor the moving mechanism of the valve spindle in detail, since they do not fall within the scope of the invention, known solutions may be used.

The valve member is slightly wedge-shaped, so that it, due to the wear, advances further in between flow pipes 2. Because the wear is strongest at point 16a (FIG. 1) of flow pipe 2, which point for the longest time remains exposed to the wearing action of the flowing medium, the actual sealing portion has in fact been moved away from the place of maximum wear. Thus, the valve remains tight.

For improving the effect referred to, the sealing surface 8 is made of a softer material than sealing surface 16. Thus, sealing surface 8 is ground against sealing surface 16. This is carried out simply by means of the movements of valve spindle 3 at the same time permitting the flow medium to press the valve member against flow pipe 2 (in FIG. 1 in the direction of the arrow). Thus, the movement permitted by T-joint 6 is made use of. The pressing of the sealing surfaces against each other with an adequate force can be obtained, if so required, also by using separate spring members, which, however, unnecessarily complicates the structure.

In order to control properly the valve member movements in all phases, the valve is provided with stationary guides 13, which are arranged to guide guide members 12 being parts of valve member body portion 9. Between guides 13 and guide members 12 there must be a sufficient clearance for the flow induced lateral motion of the valve member.

In order to provide that the grinding of sealing surfaces 8 takes place evenly, slide units 7 are arranged to rotate slightly during every valve opening cycle. For this purpose, for instance, flexible pins 14 connected to cover 15 may be used, which pins during opening of the valve are pressed against the circumferential surface of slide units 7 causing rotation of the slide units. Hence, when closing the valve, some backward rotation will in fact take place, but the actual change in position is usually sufficient in practice. For effectivating the rotation, a pawl-and-ratchet device or other mechanisms known per se may be used. The pins 14 may, alternatively, be attached to valve housing 1.

Since the flow pressure is employed in the grinding process, the grinding and the actual sealing of the valve take place in practice only by means of the action of one of the slide units whilst the other one is acting primarily as a backing-up member in order to produce a sufficient pressure between the sealing surfaces. Thus, the interior 17 of the valve housing is continuously under pressure.

If the flow medium contains impurities, which are to be removed from the sealing surfaces before the grinding process, the slide unit sealing surface 8 may be provided with a scraping edge 18 as shown in FIG. 3. Then the scraping edge removes the impurities, provided that the edge is pressed against the flow pipe sealing surface at an early stage.

The invention is not limited to the embodiments shown, but several modifications thereof are feasible within the scope of the attached claims.

I claim:

1. A slide valve or the like, comprising:
  a slightly wedge-formed valve member arranged to close a flow duct in said valve by a cross-wise movement relative to said duct;
  said valve having annular sealing surfaces surrounding said flow duct and being engageable by sealing side portions of said valve member for closing said valve;
  said sealing side portions of the valve member being considerably narrower than said annular sealing surfaces surrounding said flow duct, and being in the closing position of said valve, located relative to said annular sealing surfaces at a relatively great distance from the inner edge of said annular sealing surfaces;
  said sealing side portions of the valve member being located each to a separate unit journalled in a body portion of said valve member; and
  flexible pins eccentrically located relative to said slide units for causing rotation thereof when said slide units come into contact with said flexible pins at an extreme open position to achieve even wear on the sealing side portions of said valve member.

2. The slide valve according to claim 1, in which said sealing side portions are of a softer material than said annular sealing surfaces, so as to cause a repeated grinding of said sealing side portions of the valve member against said annular sealing surfaces when operating said valve.

3. The slide valve according to claim 1, in which said valve member is connected to a valve spindle and is movable in the direction of said flow duct.

4. The slide valve according to claim 1, in which said valve member includes guide members, which in cooperation with stationary guides are arranged to restrict the movements of said valve member in the direction of said flow duct.

5. The slide valve according to claim 1, in which said sealing side portions of the valve member are annular and provided with a scraping edge for cleaning said annular sealing surfaces.

6. A slide valve or the like, comprising:
  a slightly wedge-formed valve member arranged to close a flow duct in said valve by a cross-wise movement relative to said duct;
  said valve having annular sealing surfaces surrounding said flow duct and being engageable by sealing side portions of said valve member for closing said valve;
  said sealing side portions of the valve member being considerably narrower than said annular sealing surfaces surrounding said flow duct, and being in the closing position of said valve, clearly spaced from the inner edge of said annular sealing surfaces; and
  means inserted within the interior of the valve housing so that when said valve member is displaced into its fully open position rotatable members carrying said sealing side portions of the valve member contact said means for causing rotation of said members to obtain a different sealing position for said sealing side portions when the valve member is moved between its open and its closed position, such rotation of the valve member occurs when said rotatable members come into contact with said last-mentioned means at the extreme open position to achieve an even wear of the sealing side portions of said valve member.

7. A slide valve or the like comprising:
  a slightly wedge-formed valve member arranged to close a flow duct in said valve by a cross-wise movement relative to said duct;
  said valve having annular sealing surfaces surrounding said flow duct and being engageable by metal sealing side portions of said valve member for closing said valve;
  said sealing side portions of the valve member being considerably narrower than said annular sealing surfaces surrounding said flow duct, and being in the closing position of said valve, clearly spaced from the inner edge of said annular sealing surfaces;
  said sealing side portions of the valve member being located each to a separate slide unit journalled in a body portion of said valve member; and
  flexible pins causing rotation of said slide units, said flexible pins being eccentrically located relative to said slide units so as to rotate said slide units due to an opening or a closing movement of the valve member during operating of the valve.

8. The slide valve according to claim 7, in which said sealing side portions are of a softer material than said annular sealing surfaces, so as to cause a repeated grinding of said sealing side portions of the valve member against said annular sealing surfaces when operating said valve.

9. The slide valve according to claim 7 or 8, in which said valve member is connected to a valve spindle and is movable in the direction of said flow duct.

10. The slide valve according to claim 7 or 8, in which said valve member includes guide members, which in cooperation with stationary guides are arranged to restrict the movements of said valve member in the direction of said flow duct.

11. The slide valve according to claim 7 or 8, in which said sealing side portions of the valve member are annular and provided with a scraping edge for cleaning said annular sealing surfaces.

* * * * *